(12) United States Patent
Ruess et al.

(10) Patent No.: US 10,374,329 B2
(45) Date of Patent: Aug. 6, 2019

(54) METHOD OF MAKING A LITZ WIRE SOLDER TERMINATION

(71) Applicant: Wireless Advanced Vehicle Electrification, Inc., Salt Lake City, UT (US)

(72) Inventors: John R. Ruess, Farmington, UT (US); Patrice Lethellier, Salt Lake City, UT (US)

(73) Assignee: WIRELESS ADVANCED VEHICLE ELECTRIFICATION, INC., Salt Lake City, UT (US)

( * ) Notice: Subject to any disclaimer, the term of this patent is extended or adjusted under 35 U.S.C. 154(b) by 311 days.

(21) Appl. No.: 15/464,191

(22) Filed: Mar. 20, 2017

(65) Prior Publication Data
US 2017/0271861 A1  Sep. 21, 2017

Related U.S. Application Data

(60) Provisional application No. 62/310,307, filed on Mar. 18, 2016.

(51) Int. Cl.
| | |
|---|---|
| *H01R 43/04* | (2006.01) |
| *H01R 4/18* | (2006.01) |
| *H01R 4/20* | (2006.01) |
| *H01R 43/28* | (2006.01) |
| *H02G 1/14* | (2006.01) |
| *H02G 15/04* | (2006.01) |
| *H02G 15/18* | (2006.01) |
| *H01R 4/72* | (2006.01) |

(52) U.S. Cl.
CPC ............ *H01R 4/187* (2013.01); *H01R 4/20* (2013.01); *H01R 43/28* (2013.01); *H02G 1/14* (2013.01); *H01R 4/72* (2013.01); *H02G 15/04* (2013.01); *H02G 15/1806* (2013.01); *Y10T 29/49183* (2015.01)

(58) Field of Classification Search
CPC .......... H01R 4/187; H01R 43/28; H01R 4/20; H01R 4/72; H02G 1/14; H02G 15/04; H02G 15/1806; Y10T 29/49174; Y10T 29/49179; Y10T 29/49183; Y10T 29/49194
USPC .................................... 29/857, 861
See application file for complete search history.

(56) References Cited

U.S. PATENT DOCUMENTS

| | | | | |
|---|---|---|---|---|
| 4,268,957 A | * | 5/1981 | Sbuelz ...................... | H01R 9/05 29/871 |
| 4,584,547 A | * | 4/1986 | Thornton ................. | H01L 39/02 29/599 |
| 8,635,770 B2 | * | 1/2014 | Warner ................... | H01B 7/282 29/858 |

* cited by examiner

*Primary Examiner* — Donghai D Nguyen
(74) *Attorney, Agent, or Firm* — Kunzler Bean & Adamson; Bruce R. Needham

(57) ABSTRACT

A method for litz wire termination includes placing a ferrule over exposed conductors on an end of litz wire. The exposed conductors include a portion of the litz wire without an external insulation layer, and a portion at the end of the litz wire protrude past the ferrule. The method includes crimping the ferrule to the litz wire and placing the end of the litz wire with the ferrule in molten solder past the end of the ferrule. The method includes maintaining the litz wire in the molten solder until insulation on conductors of the litz wire is removed from the conductors in the molten solder and solder bonds to the conductors that are within in the molten solder. The method includes removing the litz wire from the molten solder and allowing the litz wire to cool until molten solder bonded to the conductors transitions to a solid state.

12 Claims, 9 Drawing Sheets

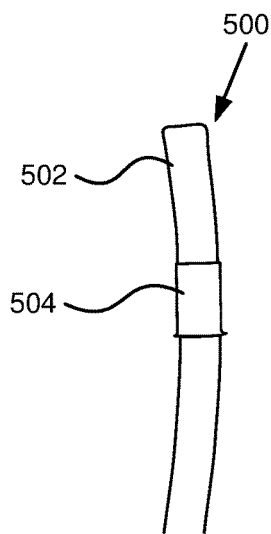
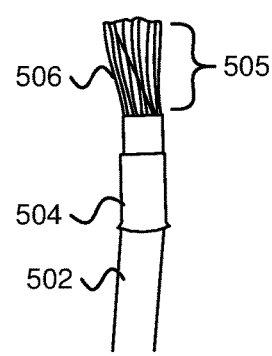
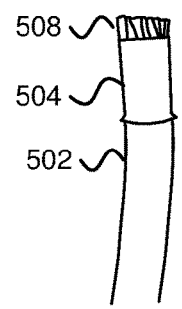
FIG. 5A　　　FIG. 5B　　　FIG. 5C
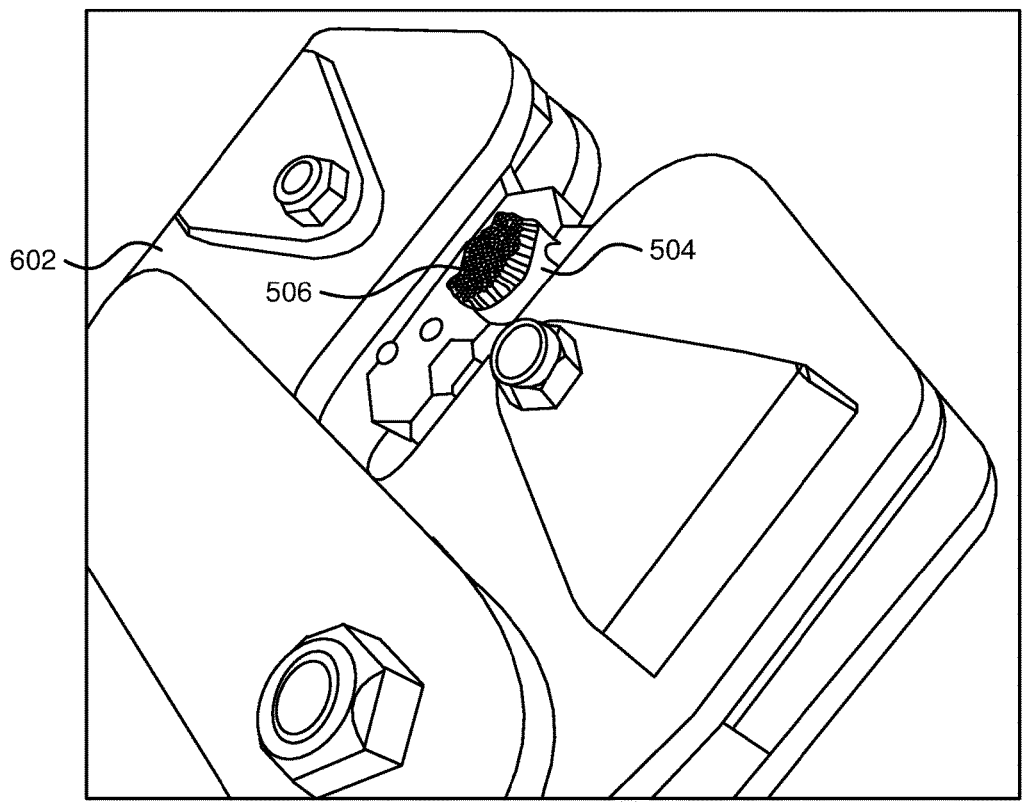
FIG. 6

METHOD OF MAKING A LITZ WIRE SOLDER TERMINATION

CROSS-REFERENCES TO RELATED APPLICATIONS

This application claims the benefit of U.S. Provisional Patent Application No. 62/310,307 entitled "LITZ WIRE SOLDER TERMINATION" and filed on Mar. 18, 2016 for John Ruess, et al., which is incorporated herein by reference.

FIELD

This invention relates to termination of conductors and more particularly relates to a solder termination of a litz wire.

BACKGROUND

Litz wire is typically used in applications where a frequency higher than a typical utility power frequency is used where losses due to skin effect and eddy currents are to be avoided. Litz wire typically includes numerous strands of conductors to avoid or minimize skin effect and eddy currents. Terminating litz wire is often problematic due to the nature of litz wire with relatively small conductors. Solder tends to wick up the conductors creating problems, such as brittleness. In addition, many litz wire terminations are subject to moisture getting in the litz wire and termination.

SUMMARY

A method for litz wire termination is disclosed. An apparatus related to the method is also disclosed. The method includes placing a ferrule over exposed conductors on an end of litz wire. The exposed conductors include a portion of the litz wire without an external insulation layer, and a portion of the exposed conductors at the end of the litz wire protrude past the ferrule. The method includes crimping the ferrule to the litz wire and placing the end of the litz wire with the ferrule in molten solder. The portion of the exposed conductors protrude past the end of the ferrule and at least a portion of the ferrule are placed in the molten solder. The method includes maintaining the litz wire in the molten solder until insulation on conductors of the litz wire that are within the molten solder is removed from the conductors in the molten solder and solder bonds to the conductors that are within in the molten solder. The method includes removing the litz wire from the molten solder and allowing the litz wire to cool until molten solder bonded to the conductors transitions to a solid state.

An apparatus to terminate litz wire includes a litz wire that has an end with exposed conductors. The exposed conductors have a section of the litz wire with external insulation removed, where the litz wire includes further external insulation covering conductors of the litz wire beyond the exposed conductors at the end of the litz wire. The apparatus includes a ferrule surrounding at portion of the exposed conductors, where a portion of the exposed conductors protrude from the ferrule at the end of the exposed conductors distal to the external insulation. At least a portion of the ferrule is crimped to the exposed conductors. The apparatus includes solder bonded to at least the exposed conductors protruding from the ferrule and a portion of the ferrule adjacent to the exposed conductors protruding from the ferrule.

Another apparatus for litz wire termination includes a litz wire comprising an end with exposed conductors. The exposed conductors include a section of the litz wire with external insulation removed. The litz wire includes further external insulation covering conductors of the litz wire beyond the exposed conductors at the end of the litz wire. The apparatus includes a ferrule surrounding at portion of the exposed conductors. A portion of the exposed conductors protrude from the ferrule at the end of the exposed conductors distal to the external insulation, where at least a portion of the ferrule is crimped to the exposed conductors. The apparatus includes solder bonded to at least the exposed conductors protruding from the ferrule and a portion of the ferrule adjacent to the exposed conductors protruding from the ferrule.

The apparatus includes a termination surrounding the exposed conductors protruding from the ferrule and at least a portion of the ferrule. The termination is soldered to the exposed conductors protruding from the ferrule and to the ferrule. The apparatus includes a heat shrink tubing surrounding a portion of the external insulation and at least a portion of the termination. The heat shrink tubing conforms to the exterior surface of the external insulation and to the termination after a process to heat the heat shrink tubing. The apparatus includes an O-ring positioned around the external insulation and under the heat shrink tubing, where the heat shrink tubing conforms to the exterior of the O-ring after the process to heat the heat shrink tubing.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 5A is a schematic drawing depicting a ferrule over an end of litz wire;

FIG. 5B is a schematic drawing of the ferrule over the litz wire with a portion of the external insulation removed to expose conductors;

FIG. 5C is a schematic drawing depicting the ferrule placed over the exposed conductors;

FIG. 6 is a schematic drawing of a crimping tool crimping the ferrule;

DETAILED DESCRIPTION

Figure 1:
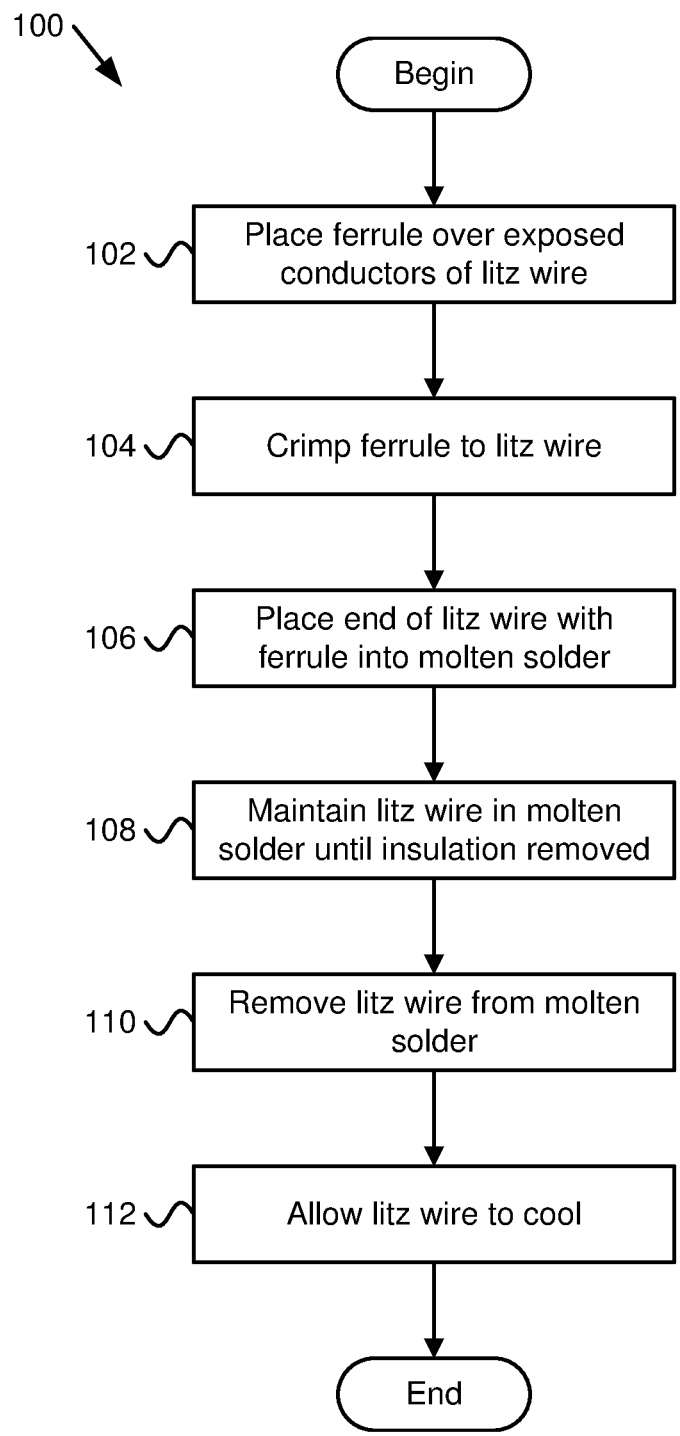
FIG. 1 is a flow chart diagram illustrating one embodiment of a method for preparing a litz wire for termination.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the invention may be combined in any suitable manner in one or more embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

A method for litz wire termination includes placing a ferrule over exposed conductors on an end of litz wire. The exposed conductors include a portion of the litz wire without an external insulation layer, and a portion of the exposed conductors at the end of the litz wire protrude past the ferrule. The method includes crimping the ferrule to the litz wire and placing the end of the litz wire with the ferrule in molten solder. The portion of the exposed conductors protrude past the end of the ferrule and at least a portion of the ferrule are placed in the molten solder. The method includes maintaining the litz wire in the molten solder until insulation on conductors of the litz wire that are within the molten solder is removed from the conductors in the molten solder and solder bonds to the conductors that are within in the molten solder. The method includes removing the litz wire from the molten solder and allowing the litz wire to cool until molten solder bonded to the conductors transitions to a solid state.

In one embodiment, the method includes stripping external insulation from the end of the litz wire, where the conductors of the litz wire are exposed after stripping the external insulation. In another embodiment, crimping the ferrule to the conductors of the litz wire includes compressing at least a portion of the ferrule with sufficient force to reduce spacing between conductors of the litz wire under the crimped portion of the litz wire and reducing space between the ferrule and the conductors of the litz wire within the crimped portion of the ferrule. In another embodiment, crimping the ferrule to the conductors of the litz wire comprises sufficient force to shrink voids in the ferrule and conductors to result in a compressed section of the ferrule that is resistant to wicking of molten solder past the compressed section of the ferrule when the litz wire is placed in the molten solder.

In one embodiment, the crimped portion of the ferrule remains compressed after crimping. In another embodiment, stripping of the external insulation from the litz wire occurs after placing the ferrule over the litz wire and further comprising sliding the ferrule over conductors of the litz wire exposed by stripping the external insulation. In another embodiment, the method includes placing solder into an opening in a termination, where the opening is configured to connect to a conductor, heating the termination until the solder in the opening of the termination is in a molten state, placing the end of the litz wire with the crimped ferrule and solidified solder into the opening of the termination prior to the molten solder in the opening of the termination transitioning to a solid state, and maintaining the litz wire in the opening of the termination until the molten solder in the opening in the termination transitions to a solid state.

In another embodiment, the termination includes a splice connector and the litz wire is a first litz wire and the method includes placing a ferrule over exposed conductors on an end of a second litz wire, where the exposed conductors have a portion of the second litz wire without an external insulation layer, and a portion of the exposed conductors at the end of the second litz wire protrude past the ferrule. In the embodiment, the method includes crimping the ferrule to the conductors of the second litz wire, placing the end of the second litz wire with the ferrule in molten solder, where the portion of the conductors protrude past the end of the ferrule and at least a portion of the ferrule are placed in the molten solder, maintaining the second litz wire in the molten solder until insulation on conductors within the molten solder is removed from the conductors in the molten solder and solder bonds to the conductors in the molten solder, removing the second litz wire from the molten solder, allowing the second litz wire to cool until molten solder bonded to the conductor transitions to a solid state, sliding the splice connector over the end of second litz wire with the ferrule, and crimping the splice connector to the ferrule of the second litz wire. The splice connector on the second litz wire forms an opening for the first litz wire.

In one embodiment, the termination includes a connector shaped for connection to an electrical device. In another embodiment, the method includes preparing the external insulation of the litz wire adjacent to the ferrule to bond to a heat shrink tubing, covering at least a portion of the termination with an insulation, placing a heat shrink tubing over the litz wire, sliding the heat shrink tubing to cover a portion of the external insulation and at least a portion of the termination, and applying heat to the heat shrink tubing sufficient to shrink the heat shrink tubing to closely conform to the external insulation and the termination covered by the heat shrink tubing. In another embodiment, the method includes placing an O-ring over the external insulation of the litz wire in a location covered by the heat shrink tubing where the heat shrink tubing shrinks over the O-ring when the heat is applied to the heat shrink tubing. In another embodiment, the method includes applying an insulation layer over at least a portion of the terminal, a portion of the ferrule protruding from the terminal and/or exposed conductor between the ferrule and the external insulation.

An apparatus to terminate litz wire includes a litz wire that has an end with exposed conductors. The exposed conductors have a section of the litz wire with external insulation removed, where the litz wire includes further external insulation covering conductors of the litz wire beyond the exposed conductors at the end of the litz wire. The apparatus includes a ferrule surrounding at portion of the exposed conductors, where a portion of the exposed conductors protrude from the ferrule at the end of the exposed conductors distal to the external insulation. At least a portion of the ferrule is crimped to the exposed conductors. The apparatus includes solder bonded to at least the exposed conductors protruding from the ferrule and a portion of the ferrule adjacent to the exposed conductors protruding from the ferrule.

In one embodiment, the apparatus includes a termination surrounding the exposed conductors protruding from the ferrule and at least a portion of the ferrule. The termination is soldered to the exposed conductors protruding from the ferrule and to the ferrule. In another embodiment, the apparatus includes a heat shrink tubing surrounding a portion of the external insulation and at least a portion of the termination. The heat shrink tubing conforms to the exterior surface of the external insulation and to the termination after a process to heat the heat shrink tubing. In another embodiment, the apparatus includes an O-ring positioned around the external insulation and under the heat shrink tubing. The heat shrink tubing conforms to the exterior of the O-ring after the process to heat the heat shrink tubing.

In another embodiment, the litz wire is a first litz wire and the termination is a splice connector to a second litz wire. The second litz wire has external insulation and a ferrule positioned over exposed conductors of the second litz wire free of external insulation. The ferrule is crimped to the exposed litz wire with a portion of the exposed conductors of the second litz wire protruding from an end of the exposed conductors, and solder is bonded to the exposed conductors protruding from the ferrule and bonded to a portion of the ferrule. The splice connector is soldered to the exposed conductors protruding from the ferrule and to the ferrule. In another embodiment, the apparatus includes heat shrink tubing surrounds a portion of the external insulation of the first litz wire and the second litz wire and surrounds the termination. The heat shrink tubing conforms to the exterior surface of the external insulation of the first litz wire and the second litz wire and to the termination after a process to heat the heat shrink tubing.

Another apparatus for litz wire termination includes a litz wire comprising an end with exposed conductors. The exposed conductors include a section of the litz wire with external insulation removed. The litz wire includes further external insulation covering conductors of the litz wire beyond the exposed conductors at the end of the litz wire. The apparatus includes a ferrule surrounding at portion of the exposed conductors. A portion of the exposed conductors protrude from the ferrule at the end of the exposed conductors distal to the external insulation, where at least a portion of the ferrule is crimped to the exposed conductors. The apparatus includes solder bonded to at least the exposed conductors protruding from the ferrule and a portion of the ferrule adjacent to the exposed conductors protruding from the ferrule.

The apparatus includes a termination surrounding the exposed conductors protruding from the ferrule and at least a portion of the ferrule. The termination is soldered to the exposed conductors protruding from the ferrule and to the ferrule. The apparatus includes a heat shrink tubing surrounding a portion of the external insulation and at least a portion of the termination. The heat shrink tubing conforms to the exterior surface of the external insulation and to the termination after a process to heat the heat shrink tubing. The apparatus includes an O-ring positioned around the external insulation and under the heat shrink tubing, where the heat shrink tubing conforms to the exterior of the O-ring after the process to heat the heat shrink tubing.

FIG. 1 is a flow chart diagram illustrating one embodiment of a method 100 for preparing a litz wire 500 for termination. Steps of the method 100 are depicted in some of FIGS. 5-8. The method 100 begins and places 102 a ferrule over exposed conductors 506 on an end of litz wire 500. The exposed conductors 506 include a portion 505 of the litz wire 500 without an external insulation layer 502, and a portion 508 of the exposed conductors 506 at the end of the litz wire 500 protrude past the ferrule 504. The method 100 crimps 104 the ferrule 504 to the litz wire. Placing 102 the ferrule 504 over the exposed conductors 506 and crimping 104 the ferrule 504 to the exposed conductors 506 provides a barrier to minimize wicking of solder up the litz wire 500, which is a problem. Having conductors of litz wire 500 with solder extending past a termination can weaken the litz wire 500. Providing a barrier to wicking of solder is advantageous to provide a stronger termination than other terminations where wicking is unchecked and may wick past the termination. In one embodiment, crimping 104 the ferrule 504 includes sufficient force to shrink voids in the ferrule 504 and exposed conductors 506 to result in a compressed section (see crimp 702 of FIG. 7) of the ferrule 504 that is resistant to wicking of molten solder past the compressed section of the ferrule 504 when the litz wire 500 is placed in the molten solder.

The method 100 places 106 the end of the litz wire 500 with the ferrule 504 in molten solder 802. The portion 508 of the exposed conductors 506 protruding past the end of the ferrule 504 and at least a portion of the ferrule 504 are placed in the molten solder 802. For example, the end of the litz wire 500 with the ferrule 504 may be placed 106 in the molten solder 802 to a location where the ferrule 504 is crimped 104 or just past where the crimp starts. In one embodiment, crimping 104 the ferrule 504 to the conductors of the litz wire 500 includes compressing at least a portion of the ferrule 504 with sufficient force to reduce spacing between conductors of the litz wire 500 under the crimped portion of the litz wire 500 and reducing space between the ferrule 504 and the conductors of the litz wire 500 within the crimped portion of the ferrule 504, which prevents wicking of solder past the crimping 702.

The method 100, in one embodiment, maintains 108 the litz wire 500 in the molten solder 802 until insulation on conductors of the litz wire that are within the molten solder 802 is removed from the conductors in the molten solder 802 and solder bonds to the conductors that are within in the molten solder 802. Typically, in order to achieve a good bond between the conductors, solder, and a termination 1002, 1402 requires that insulation be stripped from the conductors. Typical methods for removing the insulation from the conductors of litz wire as well as manufacturer recommendations include placing the conductors in solvents that dissolve the insulation.

However, the solvents are typically very toxic and require the use of a fume hood for safety and to meet governmental regulations. Placing the conductors of the litz wire 500 into molten solder 802 to melt away the insulation requires less stringent safety precautions, such as using a respirator. Use of a ferrule 504 and crimping 104 the ferrule to the exposed conductors 506 minimizes wicking of solder up the conductors of the litz wire, and maintaining 108 the portion 508 of exposed conductors 506 in the molten solder 802 long enough to melt away the insulation is a safer, more environmentally friendly method of removing insulation from the exposed conductors 506 than other typical insulation removal methods. The method 100 removes 110 the litz wire 500 from the molten solder 802, allows the litz wire 500 to cool until molten solder bonded to the conductor transitions to a solid state, and the method 100 ends.

Figure 2:
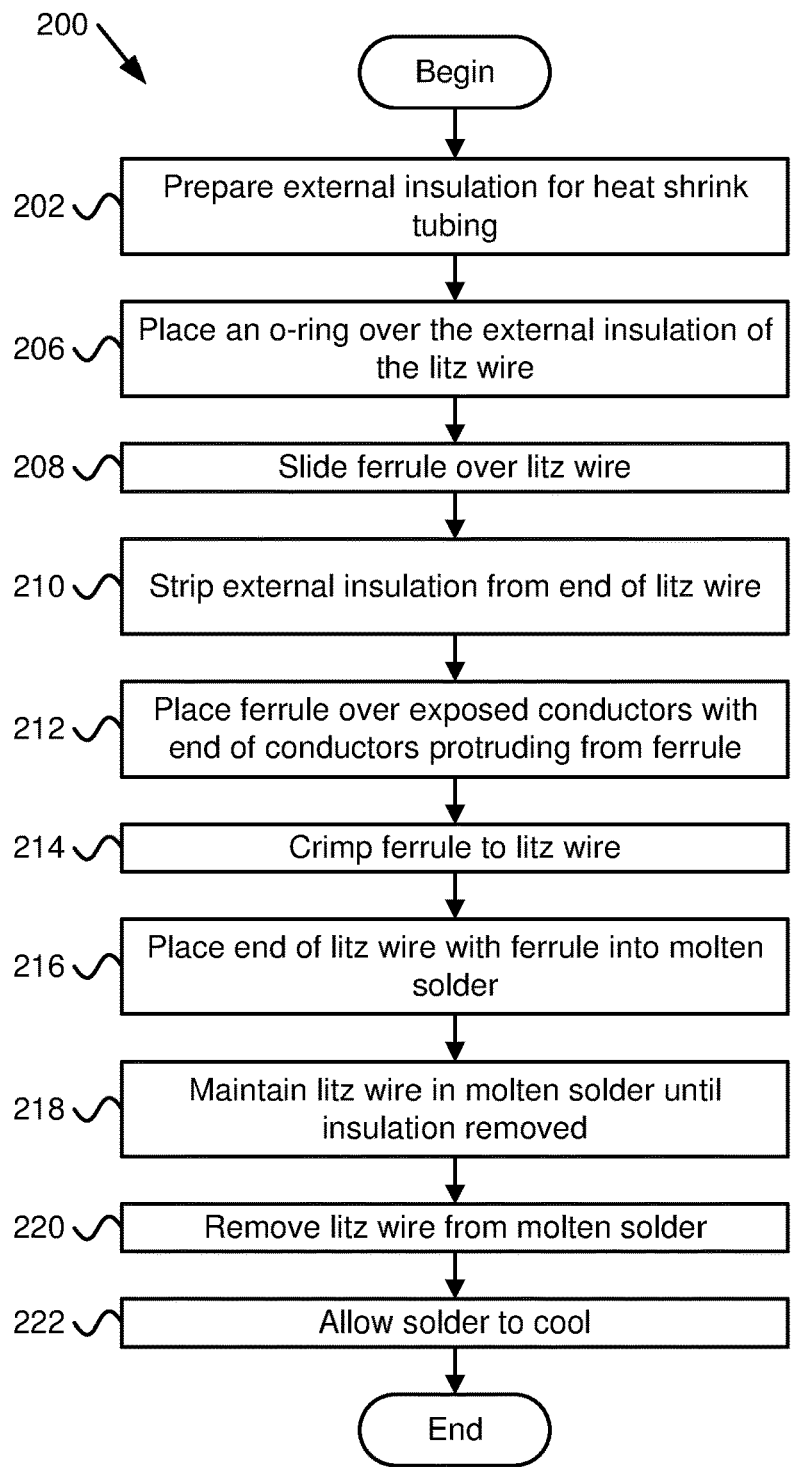
FIG. 2 is a flow chart diagram illustrating one embodiment of another method for preparing a litz wire for termination.

FIG. 2 is a flow chart diagram illustrating one embodiment of another method 200 for preparing a litz wire 500 for termination. The method 200 begins and prepares 202 the external insulation layer 502 of the litz wire 500 adjacent to the ferrule 504 to bond to a heat shrink tubing 1302. In one embodiment, the heat shrink tubing 1302 is suitable to form a water resistant or waterproof seal around the external insulation layer 502 and/or the termination 1002, 1402. Preparing 202 the external insulation layer 502 may include roughing up the external insulation layer 502, cleaning the external insulation layer 502 with isopropyl alcohol, water, solvent, etc., applying a chemical to the external insulation layer 502 that softens the external insulation layer 502, or other method known in the art to aid forming a proper seal between the external insulation layer 502 and the heat shrink tubing 1302.

Roughing up the external insulation layer 502 may include using sand paper, a steel brush, a metal file, or other tool designed to make the smooth surface of the external insulation layer 502 rough enough so that the heat shrink tubing 1302 does adheres to the external insulation layer 502. Cleaning the external insulation layer 502 may include any method designed to remove oils, solutions, dirt, etc. from the external insulation layer 502 without damaging the external insulation layer 502. Softening the external insulation layer 502 may include applying a solution or other substance that will soften at least an outer portion of the external insulation layer 502 while maintaining an insulation rating of the external insulation layer 502 with regard to protection against short circuit or electrocution hazards.

In addition, the termination 1002, 1402 or other surface, such as an insulation layer over the termination 1002, 1402, may also be prepared 202 by cleaning, roughing up the surface, etc. The heat shrink tubing 1302 may also be a type that is suitable for bonding to a surface, to form a water resistant seal, etc. The heat shrink tubing 1302 may also be of a type that is durable and can hold up to abuse, wear and tear, etc.

The method 200 optionally includes placing 206 an O-ring over the external insulation layer 502 of the litz wire 500 in a location covered by the heat shrink tubing 1302 where the heat shrink tubing 1302 shrinks over the O-ring when the heat is applied to the heat shrink tubing 1302. Placing 206 an O-ring over the external insulation layer 502 provides an additional seal to prevent liquid from seeping into the conductors of the litz wire 500. When heat is applied to the heat shrink tubing 1302, it will shrink around the O-ring to form a seal to the O-ring and the O-ring may then form a seal between the external insulation layer 502 and the O-ring. Inclusion of an O-ring may form a better liquid resistant seal than merely using the heat shrink tubing 1302. Typically, an O-ring would be used with the splice connector 1002 and is not typically used with a single ended termination 1402. However, in some embodiments of a single-ended termination 1402, an O-ring may be used.

The method 200 includes sliding 208 the ferrule 504 over the external insulation layer 502 of the litz wire 500 and stripping 210 external insulation layer 502 from the end of the litz wire 500. The conductors of the litz wire 500 are exposed after stripping the external insulation layer 502. Typically, litz wire includes and external insulation layer 502 covering numerous strands of conductor where some or all of the conductors include an additional layer of insulation. The conductors may be bundled in various ways and bundles or the main litz wire 500 may include a non-conductive core. Litz wire is typically used in applications where a frequency higher than a typical utility power frequency is used where losses due to skin effect and eddy currents are to be avoided. Litz wire typically includes numerous strands of conductors to avoid or minimize skin effect and eddy currents.

The Litz wire 500 is depicted in FIGS. 5-16 as round, but may also be square, rectangular, octagonal, etc. The ferrule 504 is typically shaped based on the shape of the litz wire 500 and tooling for compressing the ferrule 504 may be shaped to properly compress the ferrule 504 around the litz wire 500 to make an appropriate termination of the ferrule 504 onto the litz wire 500 while compressing the conductors of the litz wire 500.

The method 200 includes placing 212 the ferrule 504 over exposed conductors of the litz wire 500 exposed by stripping the external insulation layer 502. A portion 508 of the exposed conductors at the end of the litz wire 500 protrude past the ferrule 504. For example, where the ferrule 504 is previously slid 208 over the external insulation 504 and then the external insulation layer 502 is stripped 501 from the end of the litz wire 500, the ferrule 504 may be placed 212 over the exposed conductors 506 by sliding the ferrule 504 toward the end of the litz wire 500. The portion 508 of the exposed conductors 506 protruding from the ferrule 504 provides a convenient connection point to a termination 1002, 1402. For example, the exposed portion 508 may be tinned with solder for connection to a termination 1002, 1402.

In one embodiment (not shown), placing 212 (by sliding) the ferrule 504 over the exposed conductors 506 occurs after stripping 210 the external insulation 504 from the litz wire 500 where the ferrule 504 was not previously slid 208 over the external insulation layer 502. Sliding the ferrule 504 over the external insulation 204 before stripping 210 the external insulation layer 502, however, may cause some strands of conductor to bend when trying to slide 208 the ferrule 504 over exposed conductors 506. The method 200 includes crimping 214 the ferrule 504 to the litz wire 500. In one embodiment, the ferrule 504 is crimped 214 to the exposed conductors 506. In another embodiment, the ferrule 504 covers a portion of the external insulation layer 502 and the ferrule 504 is crimped 214, at least in part, to the external insulation layer 502. The method 200 includes placing 216 the end of the litz wire 500 with the ferrule 504 in molten solder 802. The portion 508 of the exposed conductors 506 protruding past the end of the ferrule 504 and at least a portion of the ferrule 504 are placed in the molten solder 802. By limiting placement 216 of the end of the litz wire 500 and just a portion of the ferrule 504 into the molten solder 804, solder 804 is not directly applied to the litz wire 500 beyond the ferrule 504 and because the ferrule 504 is crimped 214 to avoid wicking of solder 804, solder is limited to the conductors portion 508 protruding past the ferrule 504, a portion of the ferrule 504 and maybe some portion of conductors past the crimp 702. Beneficially, limiting solder this way to the end of the litz wire 500 that will be terminated helps to provide a better termination.

The method 200 includes maintaining 218 the litz wire 500 in the molten solder 802 until insulation on conductors of the litz wire 500 that are within the molten solder 802 is removed from the conductors in the molten solder 802 and solder bonds to the conductors that are within in the molten solder 802. The method 200 includes removing 220 the litz wire 500 from the molten solder 802 and allowing the litz wire 500 to cool until molten solder 802 bonded to the conductors transitions to a solid state, and the method 200 ends.

Figure 3:
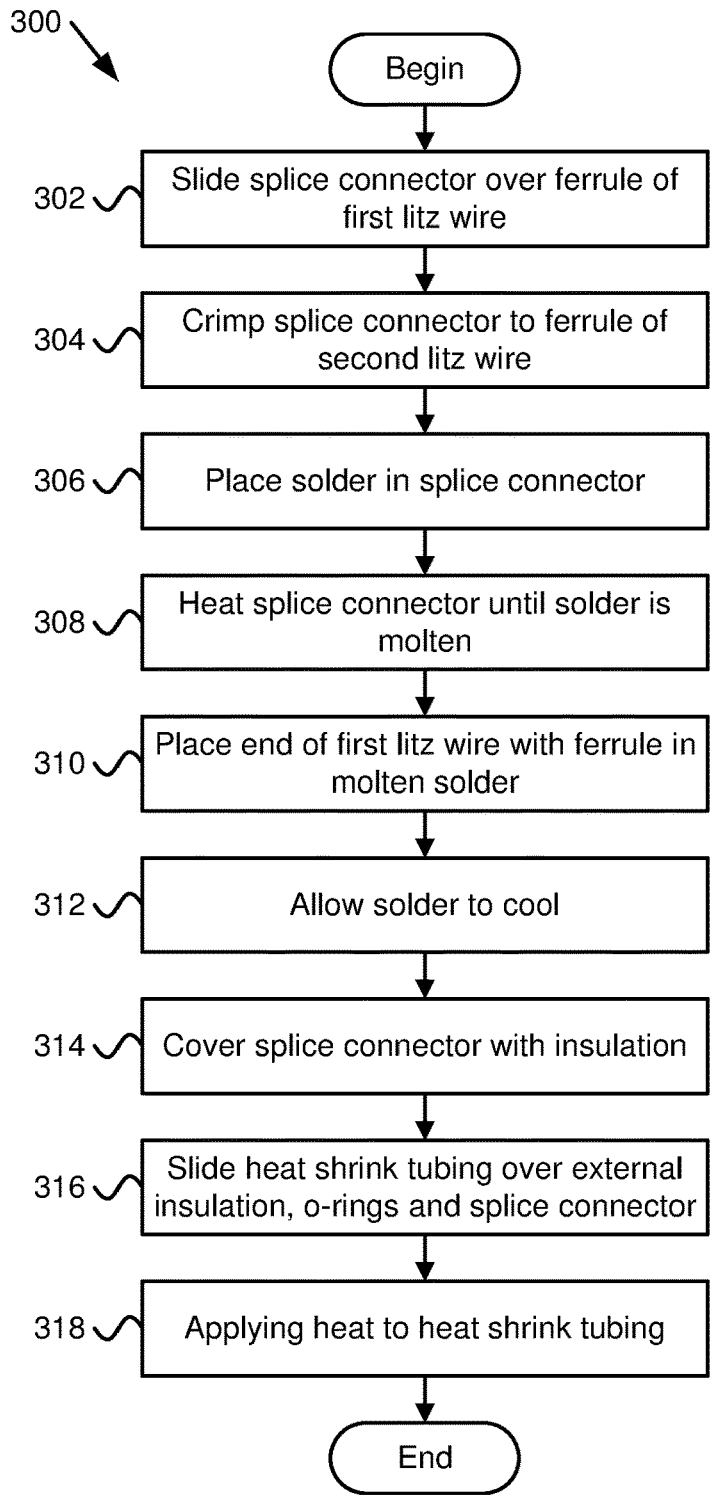
FIG. 3 is a flow chart diagram illustrating one embodiment of a method for terminating two litz wires in a splice connector where the two litz wires were previously prepared for termination.

FIG. 3 is a flow chart diagram illustrating one embodiment of a method 300 for terminating two litz wires 500 in a splice connector 1002 where the two litz wires 500 were previously prepared for termination. Where a splice connector 1002 is used, the terms "splice connector" and "termination" are used interchangeably herein. The method 300 begins at the end of either of the methods 100, 200 of FIG. 1 or 2 performed for a first litz wire 500 and a second litz wire 500. The method 300 begins and slides 302 a splice connector 1002 over the end of second litz wire 500 with the ferrule 504 and crimping 304 the splice connector 1002 to the ferrule 504 of the second litz wire 500. Crimping 304 the splice connector 1002 to the ferrule 504 of the second litz wire 500 helps to prevent molten solder from escaping past the crimp of the splice connector 1002 so that a sealed or semi-sealed container is created inside the splice connector 1002 and around the ferrule 504 and conductors of the second litz wire 500 and forms an opening for the end of the first litz wire 500 that includes the ferrule 504.

The method 300 includes placing 306 solder into the opening in the splice connector 1002 and heating 308 the splice connector 1002 until the solder in the opening of the splice connector 1002 is in a molten state. The method 300 includes placing the end of the first litz wire 500 with the crimped ferrule 504 and solidified solder into the opening of the splice connector 1002 prior to the molten solder in the opening of the splice connector 1002 transitioning to a solid state, and allowing 312 the solder to cool to transition to a solid state. Typically, the first and second litz wires 500 are held motionless until the solder cools.

The method 300 includes covering 314 the splice connector 1002 with insulation. The insulation may be heat shrink tubing designed with a certain dielectric strength, insulating tape, such as Kapton® tape, and the like. Providing a layer of insulation over the splice connector 1002 may be used to maintain a uniform insulation level along the first and second litz wires 500 and over the splice connector 1002 so there is not a decrease in insulation level at the splice.

The method 300 includes sliding 316 the heat shrink tubing 1302 to cover a portion of the external insulation layer 502 of the first and second litz wires 500, the O-rings and the splice connector 1002 and applying 318 heat to the heat shrink tubing 1302 sufficient to shrink the heat shrink tubing 1302 to closely conform to the external insulation layer 502 and the splice connector 1002 covered by the heat shrink tubing 1302, and the method 300 ends. Shrinking the heat shrink tubing 1302 to conform to the splice connector 1002, external insulation layer 502 and O-rings (where used), may then form a liquid resistant seal to prevent liquid from entering the termination.

Figure 4:
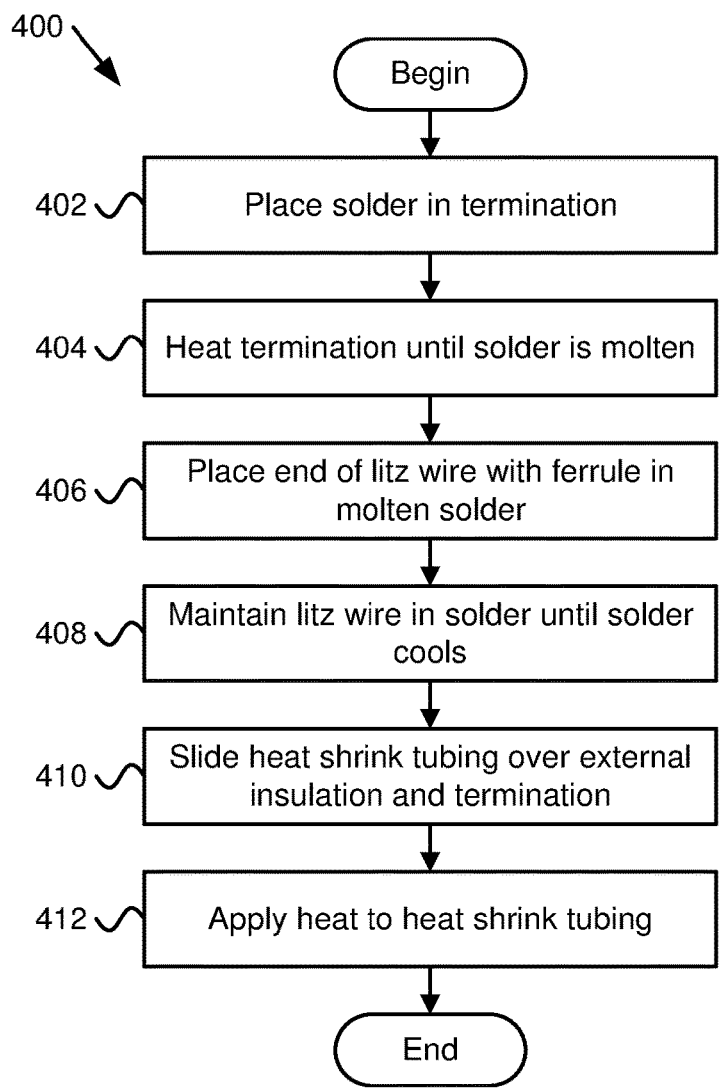
FIG. 4 is a flow chart diagram illustrating one embodiment of a method for terminating a litz wire in a termination where the litz wire was previously prepared for termination.

FIG. 4 is a flow chart diagram illustrating one embodiment of a method 400 for terminating a litz wire 500 in a termination 1402 where the litz wire 500 was previously prepared for termination 1402. The termination 1402 may be a single-ended termination suitable for connection to an electrical device. For example, the litz wire 500 may have been prepared using either of the methods 100, 200 of FIG. 1 or 2. The method 400 begins and places 402 solder into an opening in the termination 1402, where the opening is configured to connect to a conductor. The method 400 includes heating 404 the termination 1402 until the solder in the opening of the termination 1402 is in a molten state and then placing 406 the end of the litz wire 500 with the crimped ferrule 504 and solidified solder into the opening of the termination 1402 prior to the molten solder in the opening of the termination 1402 transitioning to a solid state. The method 400 then maintains 408 the litz wire 500 in the opening of the termination 1402 until the molten solder in the opening in the termination 1402 transitions to a solid state.

The method 400 includes sliding 410 the heat shrink tubing 1302 to cover a portion of the external insulation layer 502 and at least a portion of the termination 1402, applying heat to the heat shrink tubing 1302 sufficient to shrink the heat shrink tubing 1302 to closely conform to the external insulation layer 502 and the termination 1402 covered by the heat shrink tubing 1302, and the method 400 ends.

FIGS. 5A-5C and 6-16 depict steps of the methods 100-400 of FIGS. 1-4 as well as construction of an apparatus with the litz wire 500 prepared for termination and apparatuses with the litz wire 500 terminated with a single termination 1402 and a splice connector between first and second litz wires 500. FIG. 5A is a schematic drawing of a ferrule 504 over an end of litz wire 500. The ferrule 504 is below a section where the external insulation layer 502 will be removed. FIG. 5B shows the litz wire 500 with a portion 505 of the litz wire 500 with the external insulation layer 502 removed to create exposed conductors 506. In FIG. 5B, the ferrule 504 is below the exposed conductors 506. In FIG. 5C, the ferrule 504 is place (slid) over the exposed conductors 506 where a portion 508 of the exposed conductors 506 are protruding from the end of the ferrule 504.

Figure 7:
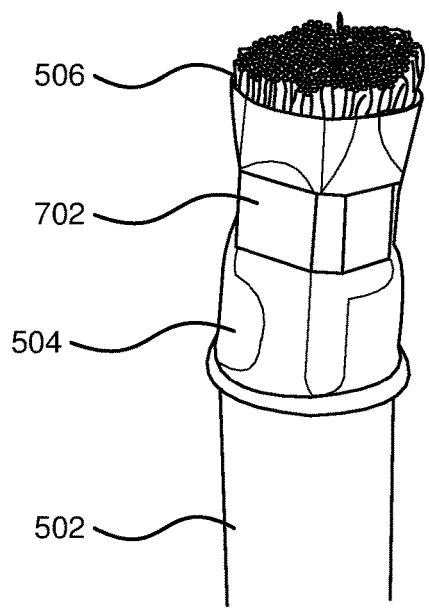
FIG. 7 is a schematic drawing of the ferrule crimped to the exposed conductors of the litz wire.

FIG. 6 is a schematic drawing of a crimping tool 602 crimping the ferrule 504. The exposed conductors 506 are shown protruding from the ferrule 504 being crimped. FIG. 7 is a schematic drawing of the ferrule 504 crimped to the exposed conductors 506 of the litz wire 500. In the schematic drawing, the ferrule 504 is positioned against the external insulation layer 502. Note that the crimp 702 is in the middle of the ferrule 504 where a portion of the ferrule 504 closest to the end of the litz wire 500 is not crimped. In addition, a portion of the ferrule 504 adjacent to the external insulation layer 502 is not crimped and may then have the termination 1002, 1402 crimped to this section. In other embodiments, the termination 1002, 1402 is crimped to the crimp 702 of the ferrule 504.

Figure 8:
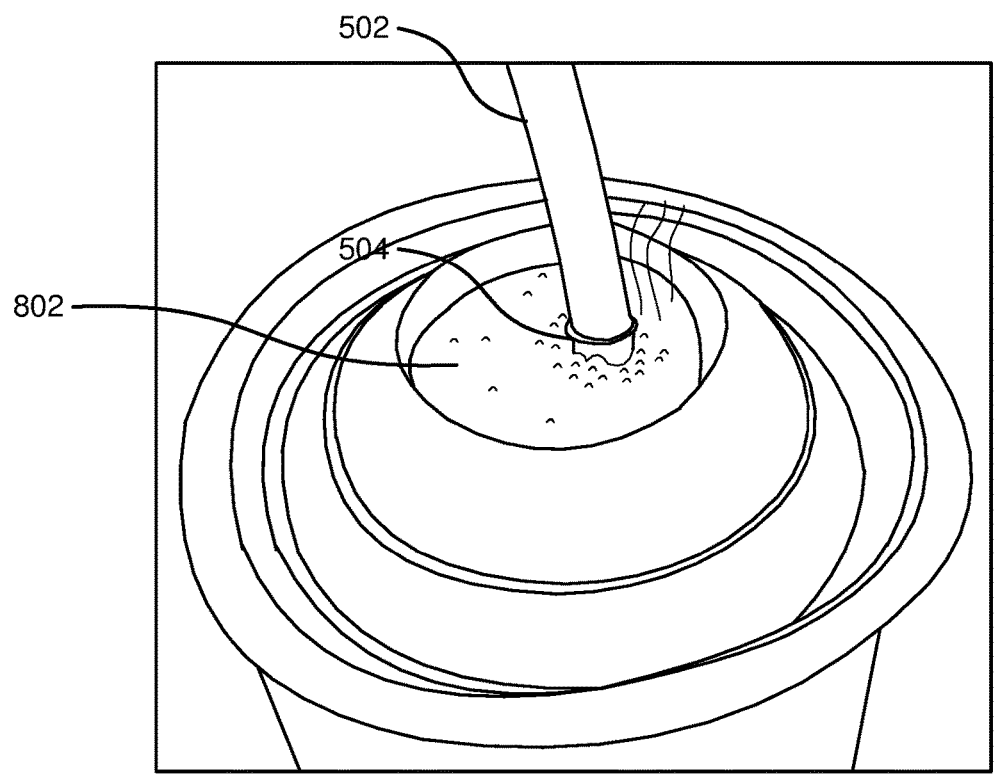
FIG. 8 is a schematic drawing of a solder pot with the end of the litz wire with the crimped ferrule inserted.

FIG. 8 is a schematic drawing of a solder pot with molten solder 802 with the end of the litz wire 500 with the crimped ferrule 504 inserted. The external insulation layer 502 is extending from the molten solder 802 and the litz wire 500 is only inserted to the crimp 702 in the ferrule 504. In one embodiment, the crimp 702 is sufficient to prevent or reduce wicking of the molten solder 802 past the crimp 702.

Figure 9:
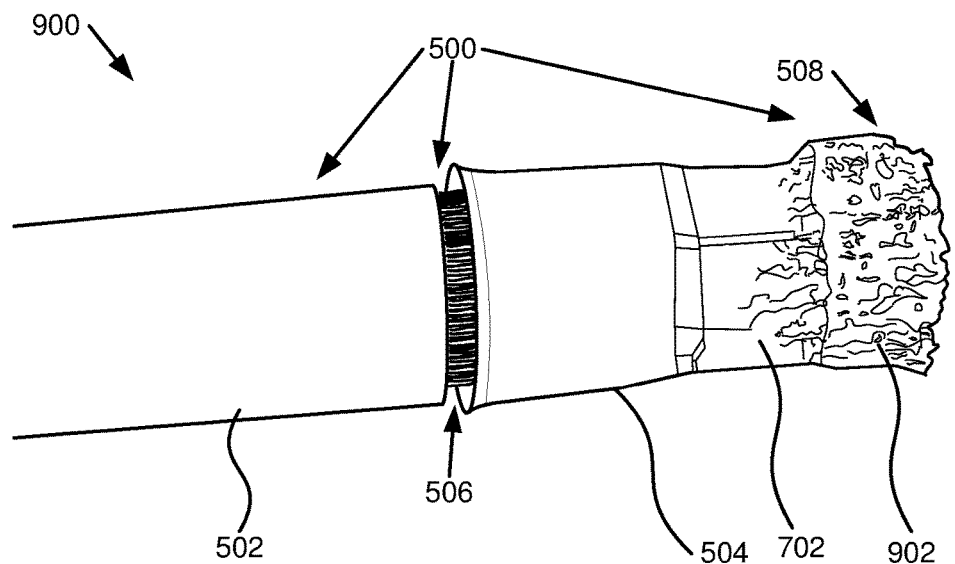
FIG. 9 is a schematic drawing of the end of the litz wire with solder bonded to the exposed conductors and the ferrule.

FIG. 9 is a schematic drawing of the end of the litz wire 500 with solder 902 bonded to the portion 508 of the exposed conductors 506 protruding from the ferrule 504 and the ferrule 504. Note that solder is not included (or visible) in the gap between the external insulation layer 502 and the ferrule 504.

In one embodiment, FIG. 9 depicts an apparatus 900 with an end with exposed conductors 506, where the exposed conductors 506 have a section of the litz wire 500 with external insulation layer 502 removed. Note that the exposed conductors 506 runs within the ferrule 504 and solder 902. The litz wire 500 includes external insulation layer 502 covering conductors of the litz wire 500 beyond the exposed conductors 506 at the end of the litz wire 500. The apparatus 900 includes a ferrule 504 surrounding at portion of the exposed conductors 506, where a portion 508 of the exposed conductors 506 protrude from the ferrule 504 at the end of the exposed conductors 506 distal to the external insulation layer 502. At least a portion of the ferrule 504 is crimped 702 to the exposed conductors 506. Solder 902 is bonded to at least the portion 508 of the exposed conductors 506 protruding from the ferrule 504 and a portion of the ferrule 504 adjacent to the portion 508 of the exposed conductors 506 protruding from the ferrule 504. In another embodiment, solder 902 is bonded to more of the ferrule 504.

Figure 10:
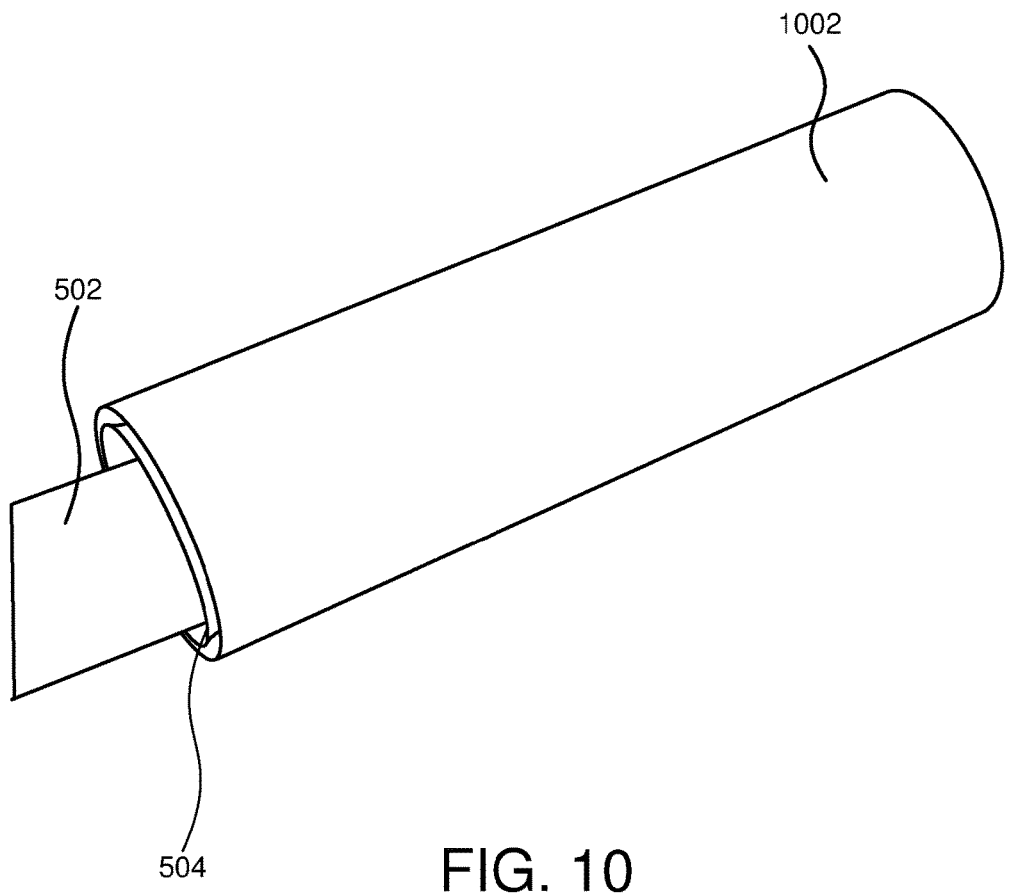
FIG. 10 is a schematic drawing of a splice connector covering the end of one litz wire and the associated ferrule.

FIGS. 10-13 depict steps of the method 300 of FIG. 3. FIG. 10 is a schematic drawing of a splice connector 1002 covering the end of one litz wire 500 and the associated ferrule 504. The litz wire 500 is a second litz wire 500 previously prepared for termination, for example using either the method 100 of FIG. 1 or the method 200 of FIG. 2 and includes a ferrule 504 with a crimp 702 and solder as depicted in FIG. 9.

Figure 11:
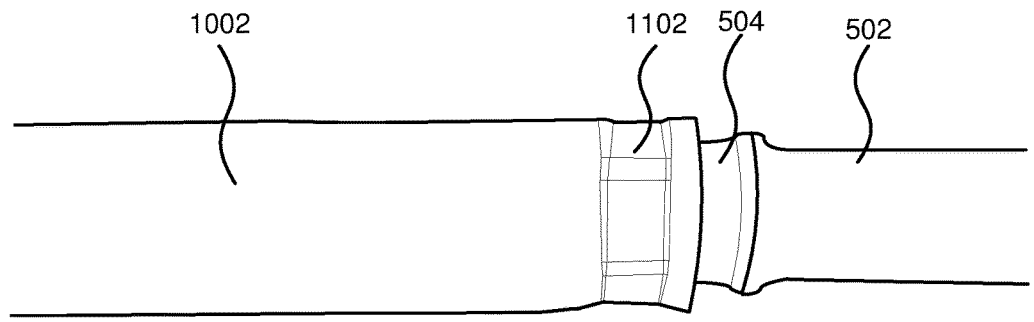
FIG. 11 is a schematic drawing of a splice connector crimped to the second litz wire and associated ferrule.

FIG. 11 is a schematic drawing of a splice connector 1002 crimped 1102 to the second litz wire 500 and associated ferrule 504. For example, the splice connector 1002 is crimped 1102 to the second litz wire 500 and associated ferrule 504 in step 304 of the method 300 of FIG. 3.

Figure 12:
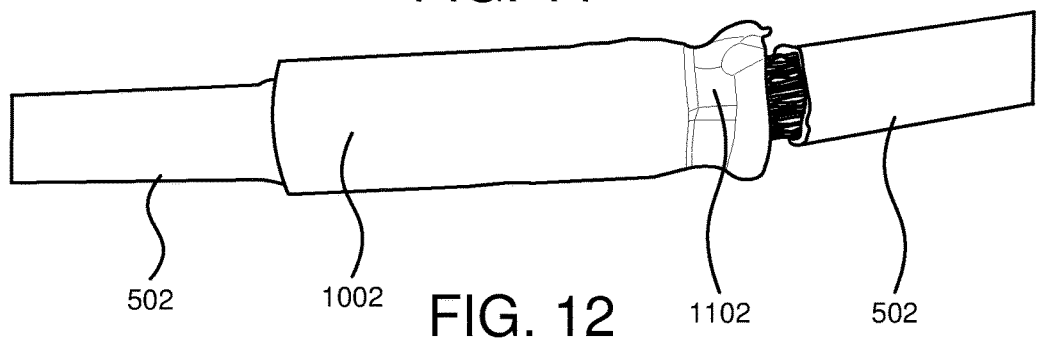
FIG. 12 is a schematic drawing of the splice connector crimped to the second litz wire and associated ferrule and with the first litz wire and associated ferrule inserted in the splice connector.

FIG. 12 is a schematic drawing of the splice connector 1002 crimped to the second litz wire 500 and associated ferrule 504 with the first litz wire 500 and associated ferrule 504 inserted in the splice connector 1002, for example as in step 310 of the method 300 of FIG. 3. Crimping the splice connector 1002 provides an opening for the first litz wire 500 and associated ferrule 504 that may be sealed sufficiently to hold molten solder during a soldering process. For example, solder may be placed in the splice connector 1002 and heated as in steps 306 and 308 of the method 300 of FIG. 3.

Figure 13:
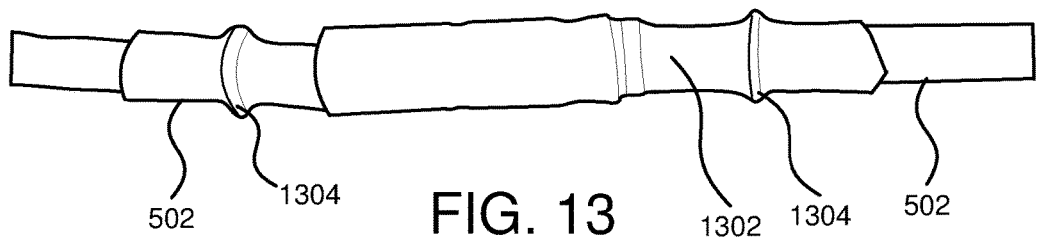
FIG. 13 is a schematic drawing of two litz wires connected by a splice connector and covered with a heat shrink tubing.

FIG. 13 is a schematic drawing of the first and second litz wires 500 connected by a splice connector 1002 and covered with a heat shrink tubing 1302. O-rings are placed below the heat shrink tubing 1302 and may form a more watertight seal than if the O-ring is not used. Locations 1304 for the O-rings are depicted as ridges in the heat shrink tubing 1302, but may vary along either side of the external insulation layer 502. The O-ring locations 1304, in one embodiment, are a distance from the ends of the heat shrink tubing 1302 and from the splice connector 1002.

Figure 14:
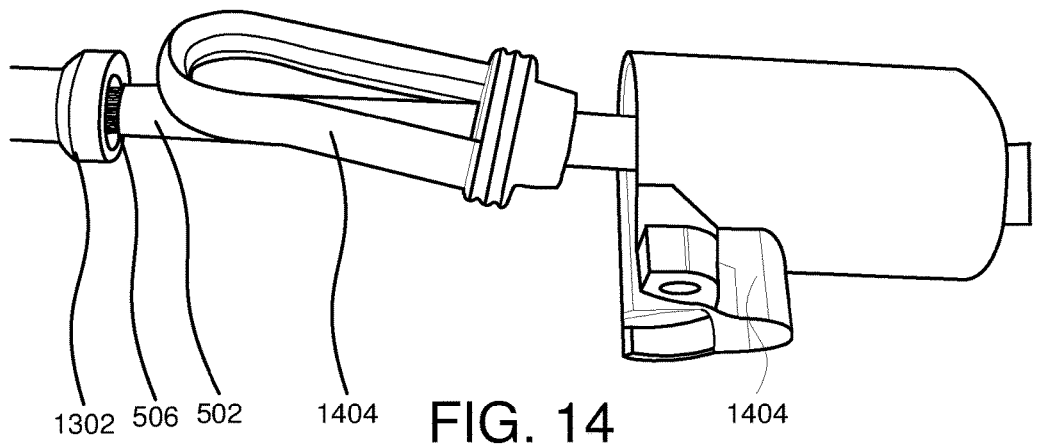
FIG. 14 is a schematic drawing of a termination and cover where the litz wire and associated ferrule are inserted in the termination.

FIG. 14 is a schematic drawing of a termination 1402 and cover where the litz wire 500 and associated ferrule 504 are inserted in the termination 1402. The particular termination 1402 includes a rubber seal 1404 and a metal cover 1406. For example, the termination 1402 may be from Pfisterer®. For example, the litz wire 500 may be placed in the termination 1402 as in step 402 of the method 400 of FIG. 4.

Figure 15:
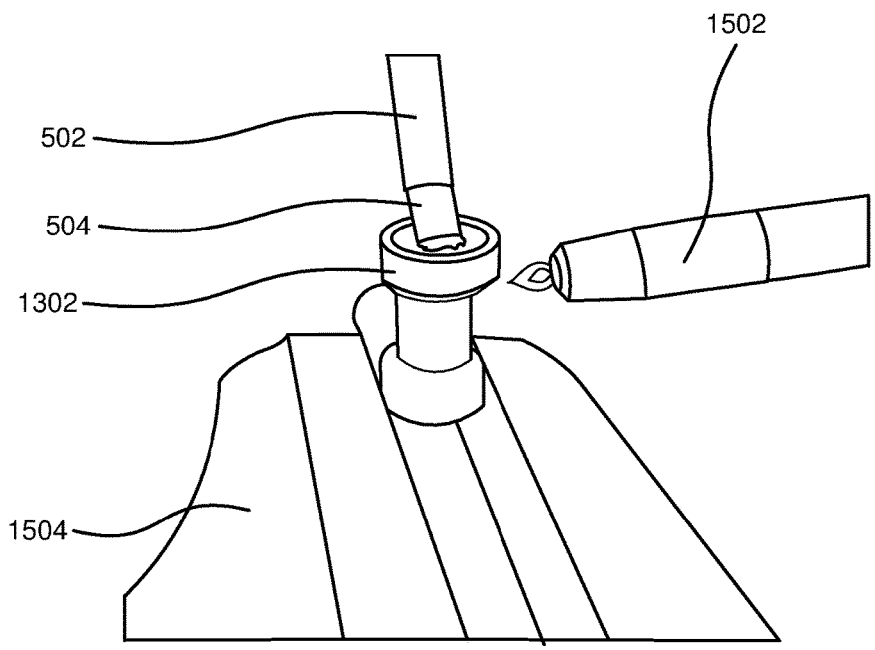
FIG. 15 is a schematic drawing of a termination being heated in preparation of litz wire and associated ferrule.

FIG. 15 is a schematic drawing of a termination 1402 being heated in preparation of litz wire 500 and associated ferrule 504, for example, as in step 404 of the method 400 of FIG. 4, and the litz wire 500 and ferrule 504 being inserted into molten solder, as in step 406 of the method 400 of FIG. 4. The schematic drawing depicts a heat source 1502, which may be a propane torch or similar torch or other heat source capable of melting solder. The termination 1402 is placed in a vice 1504 to hold the termination 1402 in a fixed position during soldering.

Figure 16:
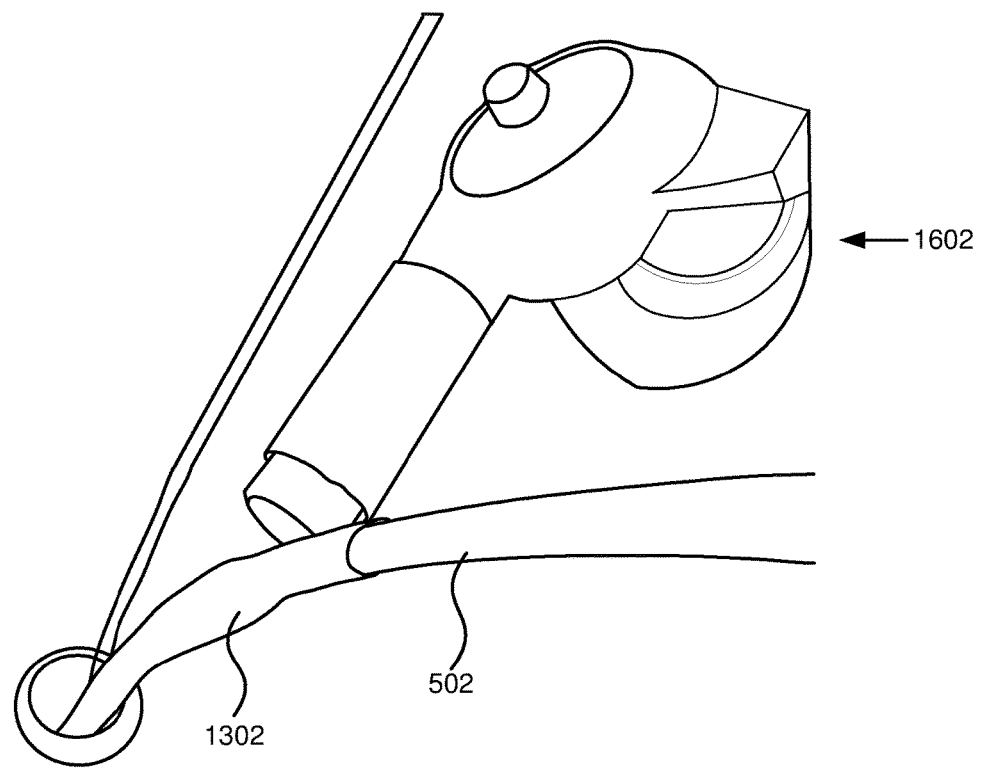
FIG. 16 is a schematic drawing of application of heat to a heat shrink tubing to shrink the heat shrink tubing around the litz wire and at least a portion of a termination.

FIG. 16 is a schematic drawing of application of heat to heat shrink tubing 1302 to shrink the heat shrink tubing 1302 around the litz wire 500 and at least a portion of a termination 1002, 1402. The application of the heat shrink tubing 1302 may be as in step 318 of the method 300 of FIG. 3 or step 412 of the method 400 of FIG. 4.

PARTS LIST

500 Litz wire
502 External insulation
504 Ferrule
505 Portion of litz wire with external insulation removed
506 Exposed conductors
508 Exposed conductors protruding from end of ferrule
602 Crimping tool
702 Crimped portion of ferrule
802 Solder pot
902 Solder-covered exposed conductors
1002 Splice connector
1102 Crimp in splice connector
1302 Heat shrink tubing
1304 Location of O-ring
1402 Termination
1404 Termination cover—rubber seal
1406 Termination cover—metal cover
1502 Heat source
1504 Vice
1602 Hot air source The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for terminating litz wire, the method comprising:
   placing a ferrule over exposed conductors on an end of litz wire, wherein the exposed conductors comprise a portion of the litz wire without an external insulation layer, and wherein a portion of the exposed conductors at the end of the litz wire protrude past the ferrule;
   crimping the ferrule to the litz wire;
   placing the end of the litz wire with the ferrule in molten solder, wherein the portion of the exposed conductors protruding past the end of the ferrule and at least a portion of the ferrule are placed in the molten solder;
   maintaining the litz wire in the molten solder until insulation on conductors of the litz wire that are within the molten solder is removed from the conductors in the molten solder and solder bonds to the conductors that are within in the molten solder;
   removing the litz wire from the molten solder; and
   allowing the litz wire to cool until molten solder bonded to the conductors transitions to a solid state.

2. The method of claim 1, further comprising stripping external insulation from the end of the litz wire, wherein the conductors of the litz wire are exposed after stripping the external insulation.

3. The method of claim 1, wherein crimping the ferrule to the conductors of the litz wire comprises compressing at least a portion of the ferrule with sufficient force to reduce spacing between conductors of the litz wire under the crimped portion of the litz wire and reducing space between the ferrule and the conductors of the litz wire within the crimped portion of the ferrule.

4. The method of claim 3, wherein crimping the ferrule to the conductors of the litz wire comprises sufficient force to shrink voids in the ferrule and conductors to result in a compressed section of the ferrule that is resistant to wicking of molten solder past the compressed section of the ferrule when the litz wire is placed in the molten solder.

5. The method of claim 1, wherein the crimped portion of the ferrule remains compressed after crimping.

6. The method of claim 1, wherein stripping of the external insulation from the litz wire occurs after placing the ferrule over the litz wire and further comprising sliding the ferrule over conductors of the litz wire exposed by stripping the external insulation.

7. The method of claim 1, further comprising:
   placing solder into an opening in a termination, the opening configured to connect to a conductor;
   heating the termination until the solder in the opening of the termination is in a molten state;
   placing the end of the litz wire with the crimped ferrule and solidified solder into the opening of the termination prior to the molten solder in the opening of the termination transitioning to a solid state; and
   maintaining the litz wire in the opening of the termination until the molten solder in the opening in the termination transitions to a solid state.

8. The method of claim 7, wherein the termination comprises a splice connector and the litz wire comprises a first litz wire and further comprising:
   placing a ferrule over exposed conductors on an end of a second litz wire, wherein the exposed conductors comprise a portion of the second litz wire without an external insulation layer, and wherein a portion of the exposed conductors at the end of the second litz wire protrude past the ferrule;
   crimping the ferrule to the conductors of the second litz wire;
   placing the end of the second litz wire with the ferrule in molten solder, wherein the portion of the conductors protruding past the end of the ferrule and at least a portion of the ferrule are placed in the molten solder;
   maintaining the second litz wire in the molten solder until insulation on conductors within the molten solder is removed from the conductors in the molten solder and solder bonds to the conductors in the molten solder;
   removing the second litz wire from the molten solder;
   allowing the second litz wire to cool until molten solder bonded to the conductor transitions to a solid state;
   sliding the splice connector over the end of second litz wire with the ferrule; and
   crimping the splice connector to the ferrule of the second litz wire,
   wherein the splice connector on the second litz wire forms an opening for the first litz wire.

9. The method of claim 7, wherein the termination comprises a connector shaped for connection to an electrical device.

10. The method of claim 7, further comprising:
    preparing the external insulation of the litz wire adjacent to the ferrule to bond to a heat shrink tubing;
    covering at least a portion of the termination with an insulation;
    placing a heat shrink tubing over the litz wire;
    sliding the heat shrink tubing to cover a portion of the external insulation and at least a portion of the termination; and
    applying heat to the heat shrink tubing sufficient to shrink the heat shrink tubing to closely conform to the external insulation and the termination covered by the heat shrink tubing.

11. The method of claim 10, further comprising placing an O-ring over the external insulation of the litz wire in a location covered by the heat shrink tubing wherein the heat shrink tubing shrinks over the O-ring when the heat is applied to the heat shrink tubing.

12. The method of claim 7, further comprising applying an insulation layer over one or more of:
    at least a portion of the terminal;
    a portion of the ferrule protruding from the terminal; and
    exposed conductor between the ferrule and the external insulation.

* * * * *